United States Patent
Pelicia et al.

(10) Patent No.: US 10,243,456 B2
(45) Date of Patent: Mar. 26, 2019

(54) VOLTAGE REGULATOR WITH LOAD CURRENT PREDICTION AND METHOD THEREFOR

(71) Applicant: NXP USA, INC., Austin, TX (US)

(72) Inventors: Marcos Mauricio Pelicia, Campinas (BR); Andre Luis Vilas Boas, Amparo (BR); Richard Titov Lara Saez, Campinas (BR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/611,961

(22) Filed: Jun. 2, 2017

(65) Prior Publication Data

US 2018/0351450 A1   Dec. 6, 2018

(51) Int. Cl.
  G05F 1/10      (2006.01)
  H02M 3/07     (2006.01)
(52) U.S. Cl.
  CPC .................................... H02M 3/07 (2013.01)
(58) Field of Classification Search
  None
  See application file for complete search history.

(56) References Cited

U.S. PATENT DOCUMENTS

| | | |
|---|---|---|
| 6,469,562 B1 | 10/2002 | Shih et al. |
| 6,978,388 B1 | 12/2005 | Cornelius |
| 7,441,137 B1 | 10/2008 | Mimberg |
| 8,752,061 B2 | 6/2014 | Litovtchenko et al. |
| 8,930,741 B2 | 1/2015 | Dibene, II et al. |
| 9,639,102 B2 * | 5/2017 | Dally ...................... G05F 1/563 |
| 2010/0148742 A1 | 6/2010 | Nakashima |
| 2010/0156364 A1 | 6/2010 | Cho et al. |
| 2014/0084883 A1 * | 3/2014 | Tanabe ................ H02M 3/1582 323/271 |
| 2014/0232361 A1 * | 8/2014 | Dally ..................... G01R 27/14 323/271 |
| 2015/0050900 A1 | 2/2015 | Zhang |
| 2016/0179163 A1 | 6/2016 | Haider et al. |

FOREIGN PATENT DOCUMENTS

WO   PCT-2005/064427 A1   7/2005

OTHER PUBLICATIONS

Torres, J., "Low Drop-Out Voltage Regulators: Capacitor-less Architecture Comparison", IEEE Circuits and Systems Magazine, Second Quarter 2014, May 20, 2014.

* cited by examiner

Primary Examiner — Lincoln Donovan
Assistant Examiner — Khareem E Almo
(74) Attorney, Agent, or Firm — Daniel D. Hill

(57) ABSTRACT

A voltage regulator includes first and second bias circuits, a transistor, and a load prediction circuit. The transistor has a first current electrode coupled to a first power supply voltage terminal, a second current electrode for providing a regulated output voltage, and a control electrode. The first biasing circuit is for providing a first bias voltage to the control electrode of the transistor in response to a feedback signal generated from the regulated output voltage. The second biasing circuit is for providing a second bias voltage to the control electrode of the transistor in response to a control signal. The load current prediction circuit is coupled to the second biasing circuit. The load prediction circuit is for providing the control signal to the second biasing circuit in response to determining that a load current at the second current electrode is expected to increase.

19 Claims, 5 Drawing Sheets

VOLTAGE REGULATOR WITH LOAD CURRENT PREDICTION AND METHOD THEREFOR

BACKGROUND

Field

This disclosure relates generally to electrical circuits, and more specifically, to a voltage regulator with load current prediction and method therefor.

Related Art

In integrated circuits, a pin-less voltage regulator is a class of voltage regulators that does not require an off-chip capacitor for complying with load transient response and stability specifications. The use of pin-less regulators in integrated circuit (IC) products provides advantages such as cost reduction, reduced number of pins on the IC, and reduced dependency from external devices and board parasitics.

FIG. 1 illustrates, in schematic diagram form, a pin-less voltage regulator 10 in accordance with the prior art. FIG. 1 shows an example implementation of a switched biasing control circuit 12 connected to N-channel transistor 14. N-channel transistor 14 has an intrinsic gate-source capacitance represented by capacitor 16 in FIG. 1. Capacitor 16 also represents all other capacitances connected to the gate of N-channel transistor 14. Biasing control circuit 12 is composed of two comparators 18 and 20 in a window comparison configuration. Comparator 18 receives a reference voltage labeled VREF_LO and controls the gate of P-channel transistor 22 in response to a comparison of VREF_LO with a feedback voltage generated from an output voltage VOUT. Comparator 20 receives a reference voltage labeled VREF_HI and provides a bias voltage to control the gate of N-channel transistor 28 in response to a comparison of VREF_HI with the feedback voltage generated from output voltage VOUT. N-channel transistor 14 drives a variable load that can be modelled by a resistance 30 and a capacitance 32. Biasing control circuit 12 controls the conductivity of N-channel transistor 14 in response to a changing load sensed via the feedback of VOUT. The reference voltages are used to set the voltage of VOUT. Reference voltage VREF_LO is lower than reference voltage VREF_HI. When output voltage VOUT is above the VREF_HI value, N-channel transistor 28 is on and current source 26 starts discharging the capacitance 16. When output voltage VOUT is below reference voltage VREF_LO value, P-channel transistor 22 is on and current source 24 charges capacitance 16.

It is desirable that voltage regulator 10 provides a stable power supply voltage within a certain margin. Generally, the output voltage variation, specified to accommodate process variations and input voltage/load transient variations, is a percentage of nominal supply voltage. As the semiconductor technology progresses to smaller technology process nodes (mainly from 55 nm and smaller), the nominal supply voltage is reduced. For example, at a 90 nm (nanometer) technology node, the power supply voltage may be 1.25 volts and at the 28 nm technology node the power supply voltage may be 0.9 volts. As a consequence, the voltage variation (in absolute value, not in percentage) was also reduced at the newer technology nodes, reducing the margin for regulator accuracy and voltage variation due to load steps. In addition, the low power techniques (power gating, clock gating, back biasing technique) greatly increase the load transient current steps. Using these low power techniques, the load transient current steps may reach up to 1000×.

If implemented in the newer technologies, voltage regulator 10 may not be able to detect and react to the faster load current steps. Also, for a fixed gate voltage if the source voltage VDD decreases, the current flowing through N-channel transistor 14 will increase to minimize source voltage drop. However, it takes time for the VOUT feedback voltage to be reacted to by biasing control 12, thus allowing a significant output voltage drop before bias circuit 12 can react to the load change.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
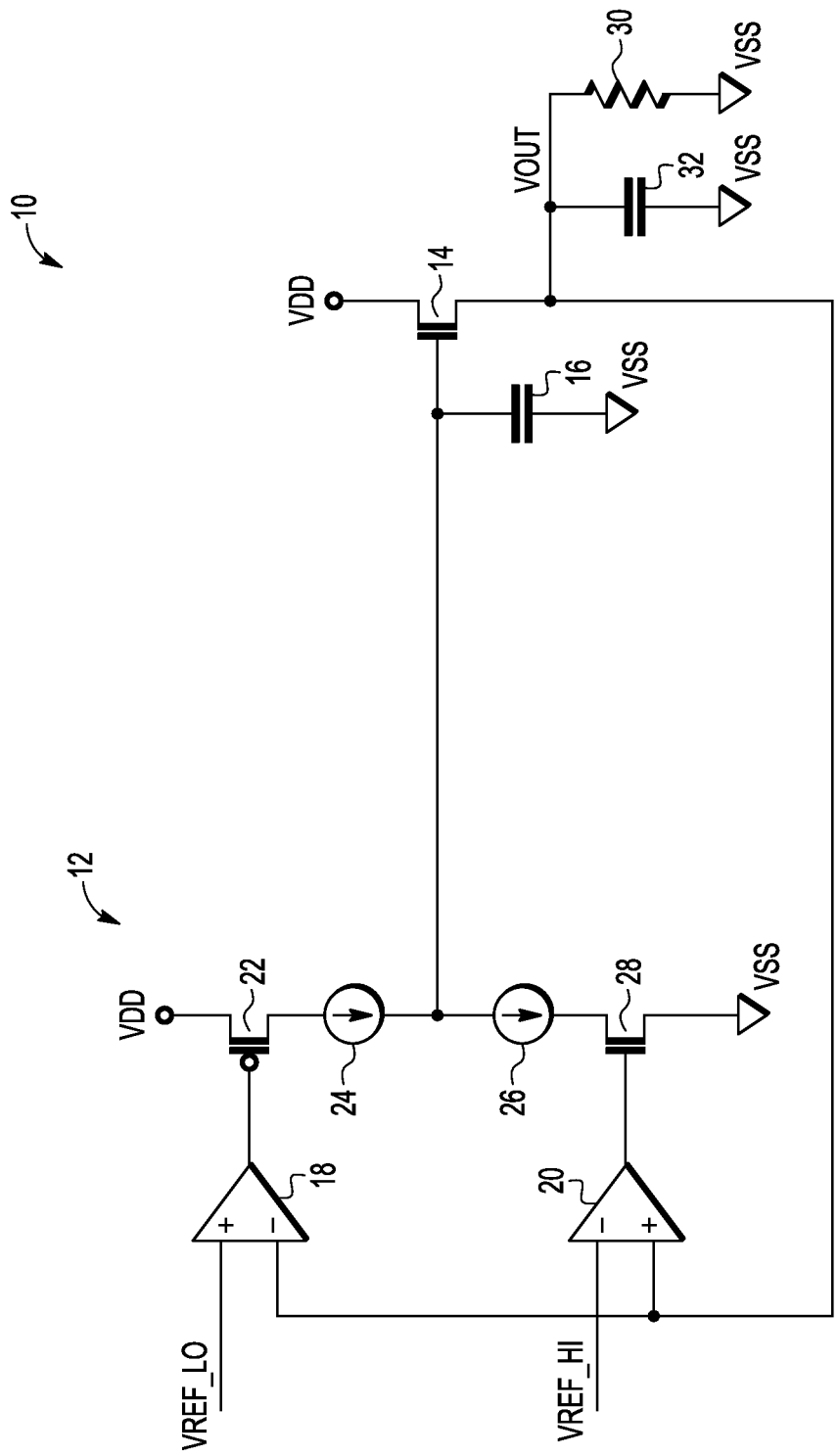
FIG. 1 illustrates, in schematic diagram form, a voltage regulator in accordance with the prior art.

Generally, there is provided, a voltage regulator implemented in an integrated circuit data processing system. The voltage regulator includes a transistor, a feedback circuit, a charge boosting circuit, and a load prediction circuit. The transistor has a first current electrode coupled to a first power supply voltage terminal, a second current electrode for providing a regulated output voltage, and a control electrode. The feedback circuit controls a bias voltage to the control electrode of the transistor in response to a feedback signal generated from the regulated output voltage. The charge boosting circuit transfers charge to the control electrode of the transistor in response to one or more control signals. The load prediction circuit is coupled to the charge boosting circuit. The load prediction circuit provides the control signal to the charge boosting circuit in response to determining that a load current at the second current electrode of the transistor is expected to increase. In one embodiment, the load prediction circuit monitors the execution of instructions, and boosts the gate voltage of the transistor when instruction execution suggests an upcoming increase in the load supplied by the transistor. In another embodiment, the load prediction circuit may monitor another aspect of data processing to predict an increase in load current.

In one embodiment, there is provided, a voltage regulator comprising: a transistor having a first current electrode coupled to a first power supply voltage terminal, a second current electrode for providing a regulated output voltage, and a control electrode; a first biasing circuit for providing a first bias voltage to the control electrode of the transistor in response to a feedback signal generated from the regulated output voltage; a second biasing circuit for providing a second bias voltage to the control electrode of the transistor in response to a control signal; and a load current prediction circuit coupled to the second biasing circuit, the load prediction circuit for providing the control signal to the second biasing circuit in response to determining that a load current at the second current electrode is expected to increase. The first biasing circuit may comprise: a first comparator having a first input terminal for receiving a first reference voltage, a second input terminal coupled to receive the feedback signal, and an output terminal coupled to a first switch; and a second comparator having a first input terminal for receiving a second reference voltage, a second input terminal coupled to receive the feedback signal, and an output terminal coupled to a second switch. The transistor may be an N-channel metal-oxide semiconductor transistor and the first current electrode may be a drain and the second current electrode may be a source. The control signal may further comprise first and second control signals, the second biasing circuit may comprise: a first switch having a first terminal coupled to the control electrode of the transistor, a second terminal, and a control terminal for receiving the first control signal from the load prediction circuit; a capacitor having a first terminal coupled to the second terminal of the first switch, and a second terminal coupled to a second power supply terminal; and a second switch having a first terminal coupled to the first terminal of the capacitor, and a second terminal coupled to receive a first voltage, and a control terminal for receiving the second control signal from the load prediction circuit. The second biasing circuit may comprise: a first switch having a first terminal coupled to the control electrode of the transistor; a second terminal, and a control terminal for receiving the first control signal from the load prediction circuit; a capacitor having a first terminal coupled to the second terminal of the first switch, and a second terminal; a second switch having a first terminal coupled to the second terminal of the capacitor, a second terminal coupled to a second power supply voltage terminal, and a control terminal for receiving the first control signal; a third switch having a first terminal coupled to the first terminal of the capacitor, a second terminal coupled to the first power supply voltage terminal, and a control terminal for receiving the second control signal from the load prediction circuit; and a fourth switch having a first terminal coupled to the second terminal of the capacitor, a second terminal coupled to the second power supply voltage terminal, and a control terminal for receiving the second control signal. The second biasing circuit may comprise: a capacitor having a first terminal coupled to the control electrode of the transistor, and a second terminal; a first switch having a first terminal coupled to the second terminal of the capacitor, a second terminal coupled to a second power supply voltage terminal, and a control terminal for receiving the first control signal from the load prediction circuit; and a second switch having a first terminal coupled to the second terminal of the capacitor, a second terminal coupled to a third power supply voltage terminal, and a control terminal coupled to receive the second control signal from the load prediction circuit. The first power supply voltage terminal may be for receiving a positive power supply voltage, the second power supply voltage terminal may be for receiving a negative power supply voltage, and the third power supply voltage terminal may be for coupling to ground. The transistor may be an N-channel transistor operating in a subthreshold region. The load prediction circuit may predict the increase in load current by monitoring instructions being executed.

In another embodiment, there is provided, a voltage regulator comprising: a transistor having a first current electrode coupled to a first power supply voltage terminal, a second current electrode for providing a regulated output voltage, and a control electrode; a feedback circuit for controlling a bias voltage to the control electrode of the transistor in response to a feedback signal generated from the regulated output voltage; a charge boosting circuit for transferring charge to the control electrode of the transistor in response to a control signal; and a load prediction circuit coupled to the charge boosting circuit, the load prediction circuit for providing the control signal to the charge boosting circuit in response to determining that a load current at the second current electrode of the transistor is expected to increase. The control signal may further comprise first and second control signals, and wherein the charge boosting circuit may comprise: a first switch having a first terminal coupled to the control electrode of the transistor, a second terminal, and a control terminal for receiving the first control signal from the load prediction circuit; a capacitor having a first terminal coupled to the second terminal of the first switch, and a second terminal coupled to a second power supply terminal; and a second switch having a first terminal coupled to the first terminal of the capacitor, and a second terminal coupled to receive a first voltage, and a control terminal for receiving the second control signal from the load prediction circuit. The control signal may further comprise first and second control signal, and wherein the charge boosting circuit may comprise: a first switch having a first terminal coupled to the control electrode of the transistor; a second terminal, and a control terminal for receiving the first control signal from the load prediction circuit; a capacitor having a first terminal coupled to the second terminal of the first switch, and a second terminal; a second switch having a first terminal coupled to the second terminal of the capacitor, a second terminal coupled to a second power supply voltage terminal, and a control terminal for receiving the first control signal; a third switch having a first terminal coupled to the first terminal of the capacitor, a second terminal coupled to the first power supply voltage terminal, and a control terminal for receiving the second control signal from the load prediction circuit; and a fourth switch having a first terminal coupled to the second terminal of the capacitor, a second terminal coupled to the second power supply voltage terminal, and a control terminal for receiving the second control signal. The control signal may further comprise first and second control signals, and wherein the second biasing circuit may comprise: a capacitor having a first terminal coupled to the control electrode of the transistor, and a second terminal; a first switch having a first terminal coupled to the second terminal of the capacitor, a second terminal coupled to a second power supply voltage terminal, and a control terminal for receiving the first control signal from the load prediction circuit; and a second switch having a first terminal coupled to the second terminal of the capacitor, a second terminal coupled to a third power supply voltage terminal, and a control terminal coupled to receive the second control signal from the load prediction circuit. The first power supply voltage terminal may be for receiving a positive power supply voltage, the second power supply voltage terminal may be for receiving a negative power supply voltage, and the third power supply voltage terminal may be for coupling to a ground. The load prediction circuit may predict the increase in load current by monitoring instructions being executed.

In yet another embodiment, there is provided, a method for providing a regulated output voltage to a load in an integrated circuit, the method comprising: providing the regulated output voltage from a source terminal of an N-channel transistor; generating a feedback signal from the regulated output voltage; providing the feedback signal to first and second comparators for controlling a bias voltage provided to a gate of the N-channel transistor; and controlling a voltage boost circuit coupled to the gate of the N-channel transistor for boosting the bias voltage by a predetermined voltage in response to anticipating an increased load current to the load. Anticipating an increased load current to the load may further comprise anticipating an increased load current by monitoring instruction execution in the integrated circuit. Boosting the bias voltage by a predetermined voltage may further comprise using a capacitor to boost the bias voltage. Controlling the voltage boost circuit may comprise: precharging a capacitor; and coupling the capacitor to the gate of the N-channel transistor in response to anticipating of the increased load current. The method may further comprise operating the N-channel transistor in a subthreshold region.

Figure 2:
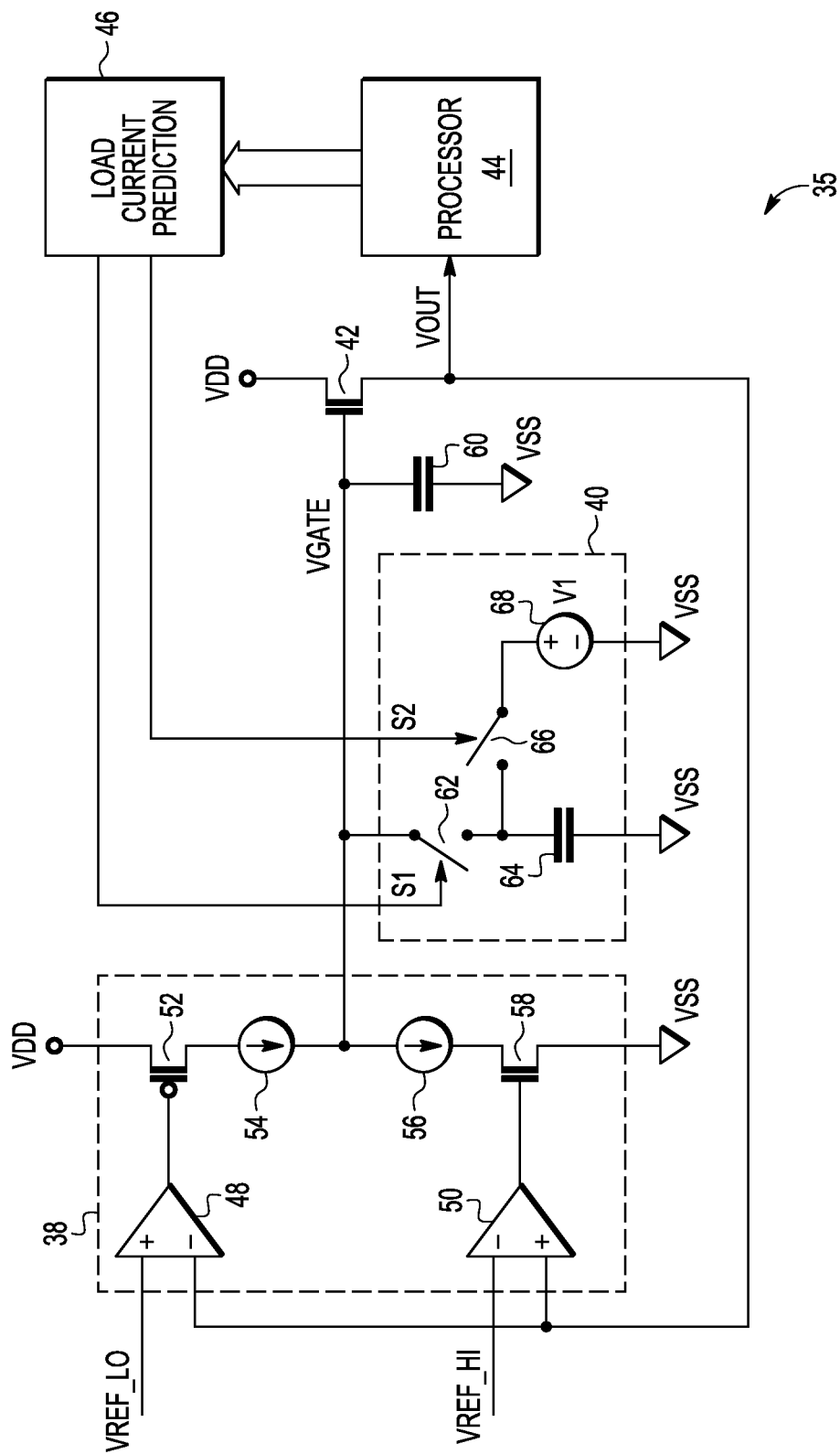
FIG. 2 illustrates, in partial schematic diagram and partial block diagram form, a voltage regulator in accordance with an embodiment.

FIG. 2 illustrates, in partial schematic diagram and partial block diagram form, voltage regulator 35 in accordance with an embodiment. Voltage regulator 35 is implemented on an integrated circuit using a conventional complementary metal-oxide semiconductor (CMOS) processing technology. Voltage regulator 35 includes biasing circuit 38, biasing circuit 40, N-channel transistor 42, and activity control circuit 46. Biasing circuit 38 includes comparators 48 and 50, P-channel transistor 52, N-channel transistor 58, and current sources 54 and 56. Biasing circuit 40 includes switches 62 and 66, capacitor 64, and voltage source 68. Voltage regulator 35 is coupled to supply a regulated output voltage to a portion of processor 44.

In biasing circuit 38, comparator 48 has a first input terminal labeled (+) for receiving reference voltage VREF_LO, a second input terminal labeled (−), and an output terminal. Comparator 50 has a first input terminal labeled (−) for receiving reference voltage VREF_HI, a second input terminal, and an output terminal. P-channel transistor 52 has a source connected to a power supply voltage terminal labeled VDD, a gate connected to the output terminal of comparator 48, and a drain. Current source 54 has a first terminal connected to the drain of P-channel transistor 52, and a second terminal. Current source 56 has a first terminal connected to the second terminal of current source 54, and a second terminal. N-channel transistor 58 has a drain connected to the second terminal of current source 56, a gate connected to the output terminal of comparator 50, and a source connected to a power supply voltage terminal labeled VSS. N-channel transistor 42 has a drain connected to VDD, a gate connected to the second terminal of current source 54, and a source for providing an output voltage labeled VOUT to a load. Output voltage VOUT is also provided as a feedback signal to the second input terminals of comparators 48 and 50. Capacitance 60 represents an intrinsic gate-to-source capacitance of N-channel transistor 42. Capacitor 16 also represents all other capacitances connected to the gate of N-channel transistor 14. In one embodiment, the load is a portion of a processor 44, such as logic circuitry, a memory, input/output circuitry, or the like. The load can be any portion of an integrated circuit.

In biasing circuit 40, switch 62 has a first terminal connected to the gate of N-channel transistor 42, a second terminal, and a control terminal. Capacitor 64 has a first terminal connected to the second terminal of switch 62, and a second terminal connected to VSS. Switch 66 has a first terminal connected to the first terminal of capacitor 64, a second terminal, and a control terminal. Voltage source 68 is coupled to provide voltage V1 to the second terminal of switch 66. Activity control 46 is connected to processor 44 with one or more conductors, has a first output terminal for receiving a control signal labeled S1 and connected to the control terminal of switch 62, and a second output terminal for providing a control signal labeled S2 and connected to the control terminal of switch 66. When asserted, control signal S2 causes switch 66 to close, charging capacitor 64 to a voltage level equal to about voltage V1. Switch 66 should be open prior to closing switch 62. Switches 62 and 66 may be implemented as transmission gates, or as single transistors. Charged capacitor 64 is discharged at the gate of N-channel transistor 42 in response to control signal S1 being asserted and closing switch 62. Discharging capacitor 64 boosts the voltage of VGATE.

In one embodiment, the power supply voltage provided to power supply voltage terminal VDD is nominally about 0.9 volts, and power supply voltage terminal VSS is connected to ground. Voltage source V1 is a positive voltage that is greater than a maximum voltage that gate voltage VGATE can reach, and may be equal to the voltage at power supply voltage terminal VDD. Reference voltage VREF_LO is lower than reference voltage VREF_HI. Processor 44 may be any kind of processor and include one or more processing cores. Processor 44 may be a microcontroller, a microprocessor, a digital signal processor (DSP), or the like. In a CMOS processing technology, current source 54 may be implemented as a P-channel transistor biased with a predetermined bias voltage. Current source 56 may be implemented as an N-channel transistor biased with a predetermined bias voltage.

In operation, N-channel transistor 42 supplies a load current to a load in processor 44. In normal operation, transistor 42 can be sized to operate in a subthreshold, or weak inversion, region. Biasing circuit 38 controls gate voltage VGATE based on a comparison of a feedback signal generated from VOUT with reference voltages VREF_LO and VREF_HI as described above in the discussion of voltage regulator 10 (FIG. 1) to provide a regulated VOUT. If the current demand at the output of voltage regulator 35 increases abruptly, biasing circuit 38 may not react quickly enough to prevent a relatively large drop in output voltage VOUT. In accordance with an embodiment, biasing circuit 40 provides a charge boost to the gate of N-channel transistor 42 in response to anticipating that a load current demand to the load is going to increase. In another embodiment, biasing circuit 40 may be implemented differently. Accordingly, in biasing circuit 40, switch 66 is closed by S2 to precharge capacitor 64 to V1 during a time when processor 44 is idle or in a steady state load condition. Activity control 46 monitors a processing activity of processor 44. When an indicator is received that indicates the load current for voltage regulator 35 is going to increase, load current prediction circuit 46 provides control signal S1 and S2 to the control terminals of switches 62 and 66, respectively. Switch 62 closes, connecting the charged capacitor 64 to the gate of N-channel transistor 42. The charge increases the gate voltage VGATE so that N-channel transistor 42 becomes more conductive and provides more current to supply the predicted increase in load current. By anticipating the increased load current, voltage regulator 35 reduces the amount of voltage drop of VOUT that may be caused when the load current increases abruptly and biasing circuit 38 cannot react quickly enough to counter the voltage drop. The voltage boost is temporary provided by biasing circuit 40 and for a predetermined time period because it is provided from a charged capacitor, allowing biasing circuit 38 to take over and provide continued regulation as needed following the increased load current event.

Many different activities in a processor can cause increased current flow that can be predicted by monitoring an indicator in the processor. For example, in one embodiment, load current prediction circuit 46 monitors the execution of instructions in processor 44. The execution of certain instructions cause increased current flow. When an instruction is executed that causes increased current in the portion of processor 44 that is supplied by voltage regulator 35, load current prediction circuit 46 asserts control signal S1 to boost gate voltage VGATE. For example, if voltage regulator 35 provides VOUT to an arithmetic logic unit (ALU), load current prediction circuit 46 may monitor the execution of instructions for instructions that use the ALU. Also, if voltage regulator 35 supplies a memory, load current prediction circuit 46 may monitor for memory access instructions. Other instruction types may trigger the assertion of control signal S1 in other embodiments. Another indicator of increased current flow may be the assertion of certain control signals, for example, a write enable for a memory, a reset signal, a request for data, or the like.

Figure 3:
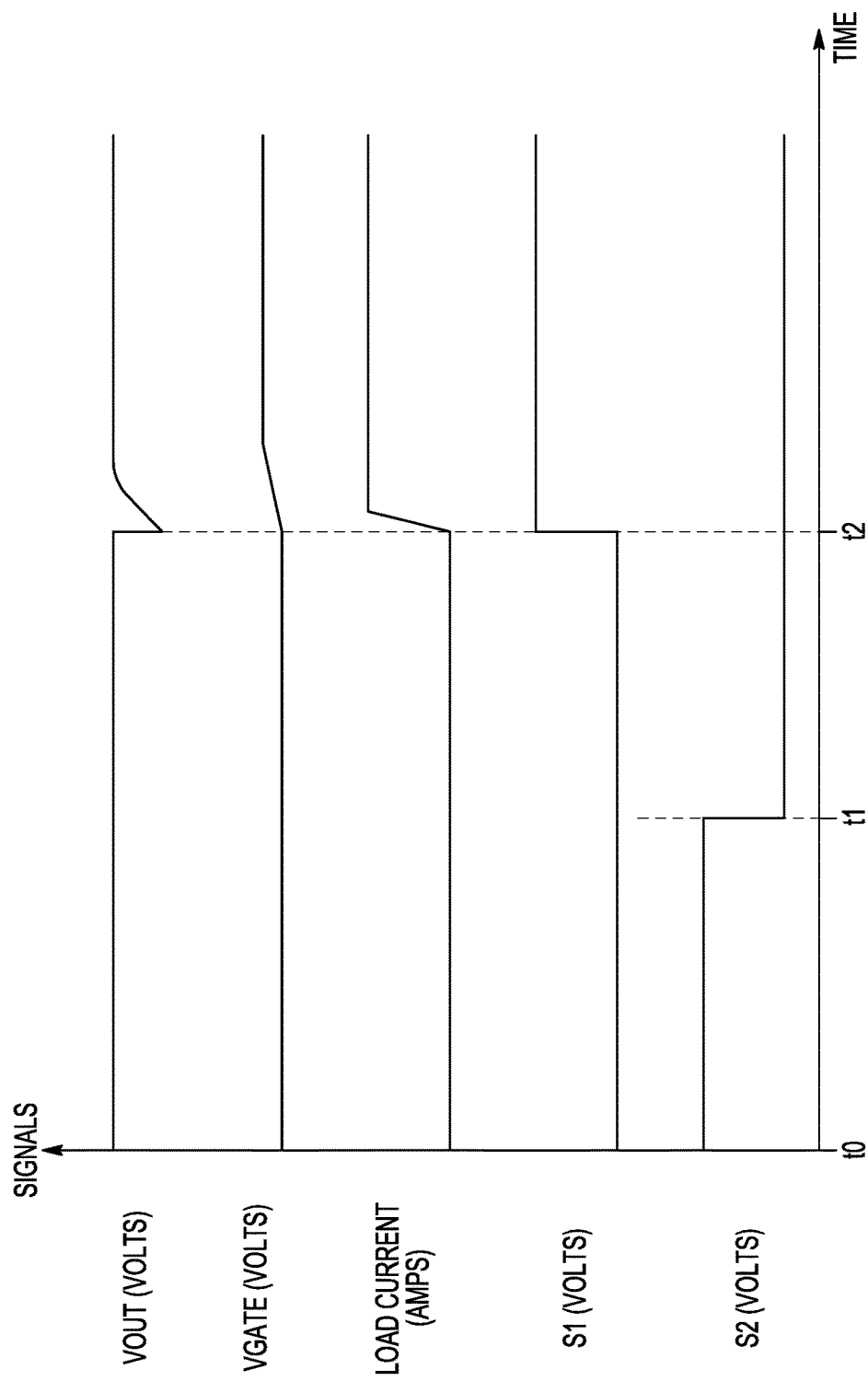
FIG. 3 illustrates waveforms of various signals of the voltage regulator of FIG. 2.

FIG. 3 illustrates waveforms of various signals for a better understanding of the operation of voltage regulator 35 (FIG. 2). At time t0, the load current LOAD CURRENT is relatively constant and output voltage VOUT is normal. Control signal S1 is a logic low causing switch 62 to be open. Control signal S2 is asserted as a logic high, causing switch 66 to be closed. Voltage V1 is provided to the first terminal of capacitor 64, causing capacitor 64 to be precharged to about V1. The time after t0 capacitor 64 is charged and ready for an increase in load current. The voltage level of V1 and the size of capacitor 64 are chosen to provide a predetermined amount of voltage boost to gate voltage VGATE. The sensitivity of transistor 42 to a gate voltage may be reduced by implementing transistor 42 to operate in a subthreshold region instead of an active region. This also allows a simpler circuit to be used for providing the boosted gate voltage. In another embodiment, transistor 42 may be a different transistor type or may be biased to operate in a different operating region. Just before time t2, load current prediction circuit 46 determines that a load current at VOUT is about to increase because of increased activity in the portion of processor 44 supplied by voltage regulator 35. As stated above, the prediction may be made by monitoring instruction execution. At time t2, in response to the prediction, load current prediction circuit 46 asserts control signal S1 as a logic high. The logic high control signal S1 causes switch 62 to close at about the same time that the load current increases abruptly. Note that switch 66 opens before switch 62 closes at time t1. As can be seen in FIG. 3, voltage VGATE is boosted to compensate for the increased load current. As a result, voltage VOUT in voltage regulator 35 drops a smaller amount than it would have in voltage regulator 10 without load current prediction. In some embodiments, the improvement may be significant.

Figure 4:
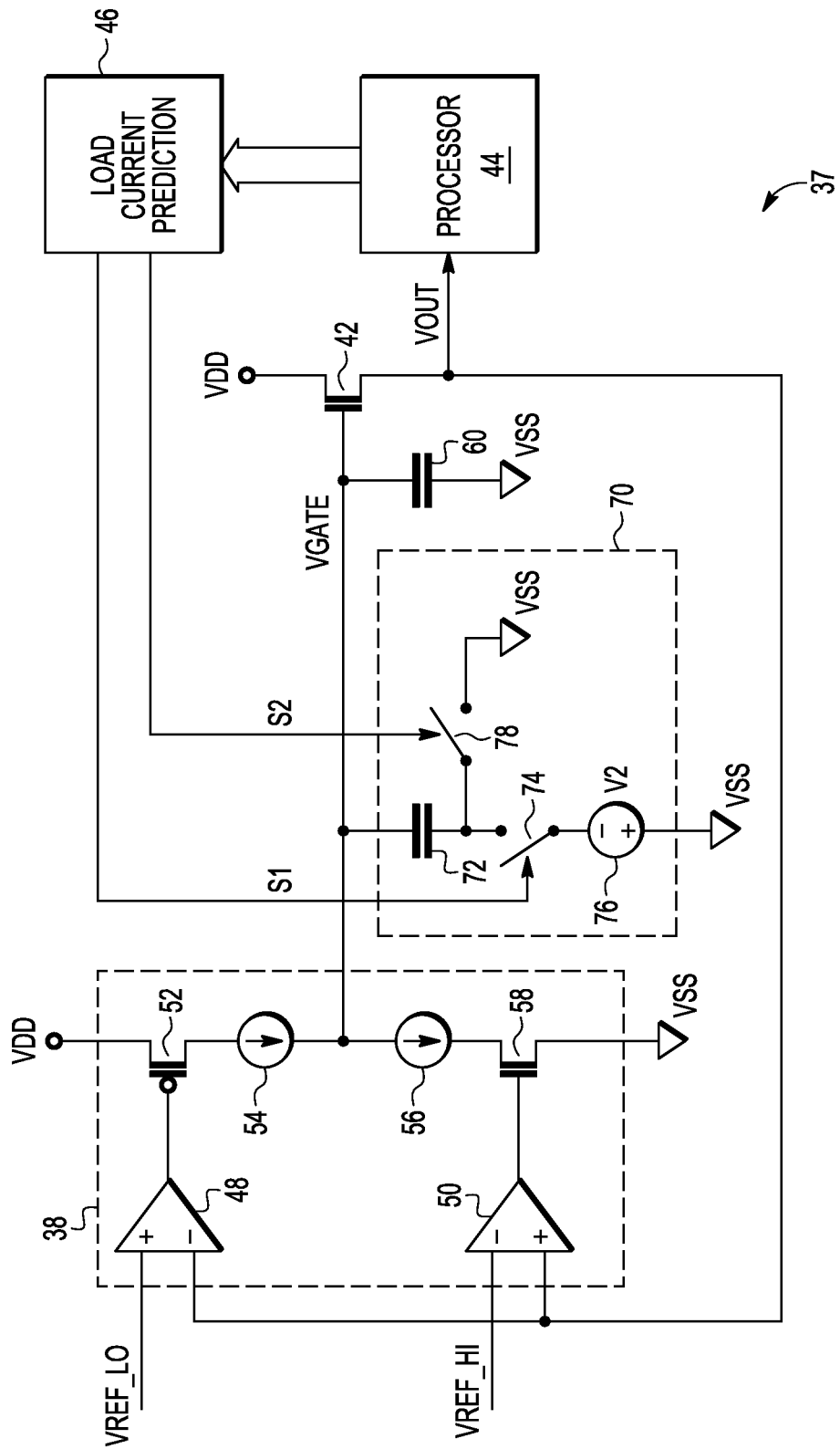
FIG. 4 illustrates, in partial schematic diagram form and partial block diagram form, a voltage regulator in accordance with another embodiment.

FIG. 4 illustrates, in partial schematic diagram form and partial block diagram form, voltage regulator 37 in accordance with another embodiment. Voltage regulator 37 is the same as voltage regulator 35 except that biasing circuit 40 has been replaced with biasing circuit 70. Biasing circuit 70 includes capacitor 72, switches 74 and 78, and voltage source V2. Capacitor 72 has a first terminal connected to the gate of N-channel transistor 42, and a second terminal. Switch 74 has a first terminal connected to the second terminal of capacitor 72, a second terminal connected to receive a voltage V2, and a control terminal for receiving control signal S1. Voltage V2 is a negative voltage. Switch 78 has a first terminal connected to the second terminal of capacitor 72, a second terminal connected to VSS, and a control terminal for receiving control signal S2. Biasing circuit 70 works substantially the same as biasing circuit 40 in FIG. 2, and may be desirable in an integrated circuit that has a negative voltage available. Generally, closing switch 74 causes capacitor 72 to be precharged and closing switch 78 after switch 74 is opened boosts gate voltage VGATE. More specifically, the operation of voltage regulator 37 is substantially the same as the operation of voltage regulator 35 and as illustrated by the waveforms of FIG. 3.

Figure 5:
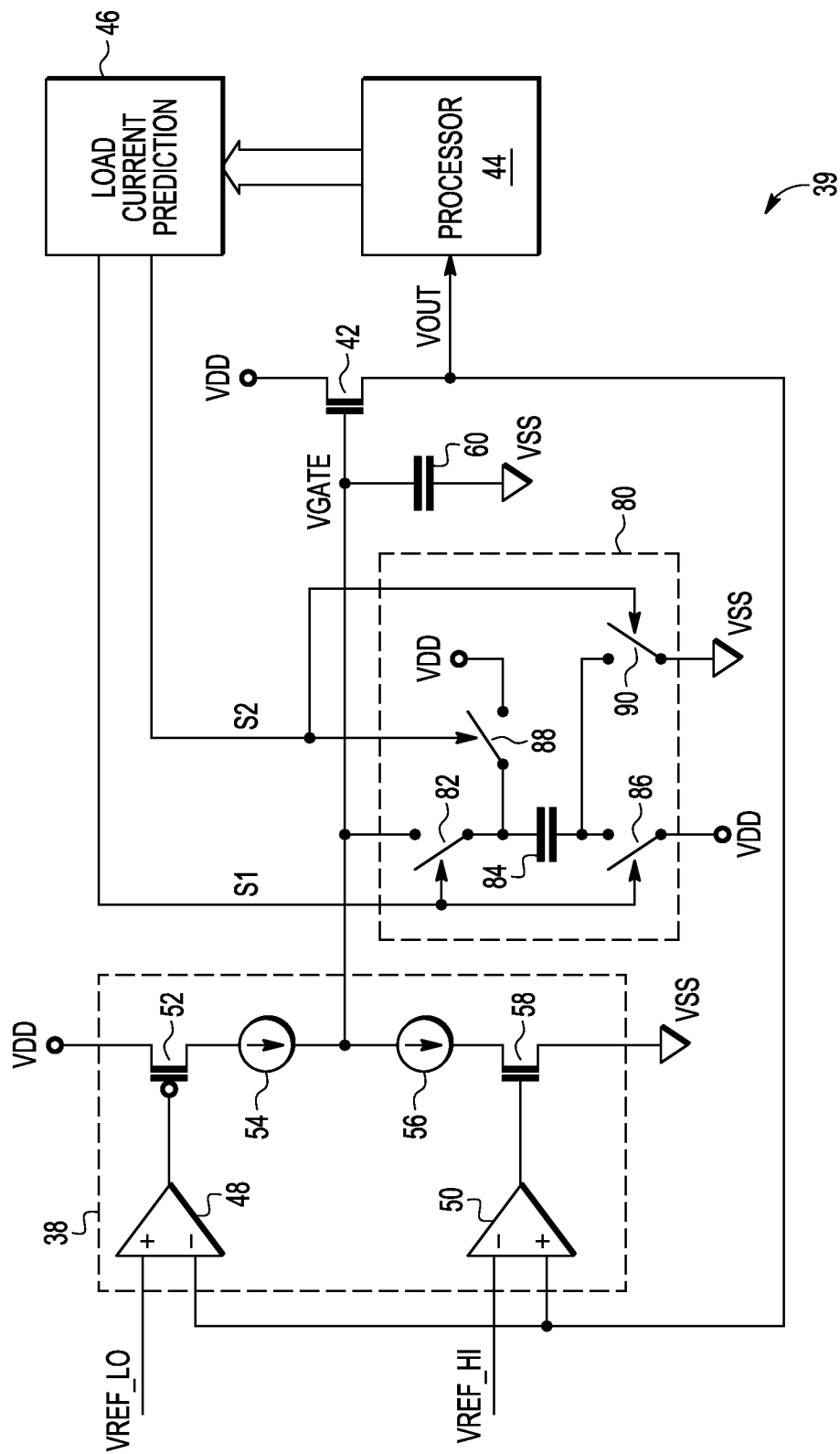
FIG. 5 illustrates, in partial schematic diagram form and partial block diagram form, a voltage regulator in accordance with another embodiment.

FIG. 5 illustrates, in partial schematic diagram form and partial block diagram form, voltage regulator 39 in accordance with another embodiment. Voltage regulator 39 is the same as voltage regulator 35 except that biasing circuit 40 is replaced with biasing circuit 80. Biasing circuit 80 includes switches 82, 86, 88, and 90, and capacitor 84. Switch 82 has a first terminal connected to the gate of N-channel transistor 42, a second terminal, and a control terminal for receiving control signal S1. Capacitor 84 has a first terminal connected to the second terminal of switch 82, and a second terminal. Switch 86 has a first terminal connected to the second terminal of capacitor 84, a second terminal connected to receive VDD, and a control terminal for receiving control signal S1. Switch 88 has a first terminal connected to the first terminal of capacitor 84, a second terminal for receiving VDD, and a control terminal for receiving control signal S2. Switch 90 has a first terminal connected to the second terminal of capacitor 84, a second terminal connected to VSS, and a control terminal for receiving control signal S2. As discussed above, asserting control signal S2 precharges capacitor 84 and asserting control signal S1 after control signal S2 is negated causes the stored charge in capacitor 84 to boost the gate voltage VGATE. When control signal S2 is asserted and control signal S1 is negated, switches 88 and 90 are closed and switches 82 and 86 are open to precharge capacitor 84. To boost voltage VGATE, signal S2 is negated and signal S1 is asserted. When signal S1 is asserted, switches 82 and 86 close, causing charged capacitor 84 to be connected between VDD the gate of N-channel transistor 42 to boost VGATE. The waveforms of FIG. 3 also illustrates the operation of voltage regulator 39.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A voltage regulator comprising:
    a transistor having a first current electrode coupled to a first power supply voltage terminal, a second current electrode for providing a regulated output voltage, and a control electrode;
    a first biasing circuit for providing a first bias voltage to the control electrode of the transistor in response to a feedback signal generated from the regulated output voltage;
    a second biasing circuit for providing a second bias voltage to the control electrode of the transistor in response to a control signal; and
    a load current prediction circuit coupled to the second biasing circuit, the load prediction circuit for providing the control signal to the second biasing circuit in response to determining that a load current at the second current electrode is expected to increase.

2. The voltage regulator of claim 1, wherein the first biasing circuit comprises:
    a first comparator having a first input terminal for receiving a first reference voltage, a second input terminal coupled to receive the feedback signal, and an output terminal coupled to a first switch; and
    a second comparator having a first input terminal for receiving a second reference voltage, a second input terminal coupled to receive the feedback signal, and an output terminal coupled to a second switch.

3. The voltage regulator of claim 1, wherein the transistor is an N-channel metal-oxide semiconductor transistor and the first current electrode is a drain and the second current electrode is a source.

4. The voltage regulator of claim 1, wherein the control signal further comprises first and second control signals, the second biasing circuit comprises:
    a first switch having a first terminal coupled to the control electrode of the transistor, a second terminal, and a control terminal for receiving the first control signal from the load prediction circuit;
    a capacitor having a first terminal coupled to the second terminal of the first switch, and a second terminal coupled to a second power supply terminal; and
    a second switch having a first terminal coupled to the first terminal of the capacitor, and a second terminal coupled to receive a first voltage, and a control terminal for receiving the second control signal from the load prediction circuit.

5. The voltage regulator of claim 1, wherein the second biasing circuit comprises:
    a first switch having a first terminal coupled to the control electrode of the transistor; a second terminal, and a control terminal for receiving the first control signal from the load prediction circuit;
    a capacitor having a first terminal coupled to the second terminal of the first switch, and a second terminal;
    a second switch having a first terminal coupled to the second terminal of the capacitor, a second terminal coupled to a second power supply voltage terminal, and a control terminal for receiving the first control signal;
    a third switch having a first terminal coupled to the first terminal of the capacitor, a second terminal coupled to the first power supply voltage terminal, and a control terminal for receiving the second control signal from the load prediction circuit; and
    a fourth switch having a first terminal coupled to the second terminal of the capacitor, a second terminal coupled to the second power supply voltage terminal, and a control terminal for receiving the second control signal.

6. The voltage regulator of claim 1, wherein the second biasing circuit comprises:
    a capacitor having a first terminal coupled to the control electrode of the transistor, and a second terminal;
    a first switch having a first terminal coupled to the second terminal of the capacitor, a second terminal coupled to a second power supply voltage terminal, and a control terminal for receiving the first control signal from the load prediction circuit; and
    a second switch having a first terminal coupled to the second terminal of the capacitor, a second terminal coupled to a third power supply voltage terminal, and a control terminal coupled to receive the second control signal from the load prediction circuit.

7. The voltage regulator of claim 6, wherein the first power supply voltage terminal is for receiving a positive power supply voltage, the second power supply voltage terminal is for receiving a negative power supply voltage, and the third power supply voltage terminal is for coupling to ground.

8. The voltage regulator of claim 1, wherein the transistor is an N-channel transistor operating in a subthreshold region.

9. The voltage regulator of claim 1, wherein the load prediction circuit predicts the increase in load current by monitoring instructions being executed.

10. A voltage regulator comprising:
    a transistor having a first current electrode coupled to a first power supply voltage terminal, a second current electrode for providing a regulated output voltage, and a control electrode;
    a feedback circuit for controlling a bias voltage to the control electrode of the transistor in response to a feedback signal generated from the regulated output voltage;
    a charge boosting circuit for transferring charge to the control electrode of the transistor in response to a control signal, the charge boosting circuit comprising:
        a first switch having a first terminal coupled to the control electrode of the transistor, a second terminal, and a control terminal for receiving the first control signal from a load prediction circuit;
        a capacitor having a first terminal coupled to the second terminal of the first switch, and a second terminal coupled to a second power supply terminal; and
        a second switch having a first terminal coupled to the first terminal of the capacitor, and a second terminal coupled to receive a first voltage, and a control terminal for receiving the second control signal from the load prediction circuit; and the load prediction circuit coupled to the charge boosting circuit, the load prediction circuit for providing the control signal to the charge boosting circuit in response to determining that a load current at the second current electrode of the transistor is expected to increase.

11. The voltage regulator of claim 10, wherein the control signal further comprises first and second control signal, and wherein the charge boosting circuit comprises:

a first switch having a first terminal coupled to the control electrode of the transistor; a second terminal, and a control terminal for receiving the first control signal from the load prediction circuit;

a capacitor having a first terminal coupled to the second terminal of the first switch, and a second terminal;

a second switch having a first terminal coupled to the second terminal of the capacitor, a second terminal coupled to a second power supply voltage terminal, and a control terminal for receiving the first control signal;

a third switch having a first terminal coupled to the first terminal of the capacitor, a second terminal coupled to the first power supply voltage terminal, and a control terminal for receiving the second control signal from the load prediction circuit; and a fourth switch having a first terminal coupled to the second terminal of the capacitor, a second terminal coupled to the second power supply voltage terminal, and a control terminal for receiving the second control signal.

12. The voltage regulator of claim 10, wherein the control signal further comprises first and second control signals, and wherein the second biasing circuit comprises:

a capacitor having a first terminal coupled to the control electrode of the transistor, and a second terminal;

a first switch having a first terminal coupled to the second terminal of the capacitor, a second terminal coupled to a second power supply voltage terminal, and a control terminal for receiving the first control signal from the load prediction circuit; and a second switch having a first terminal coupled to the second terminal of the capacitor, a second terminal coupled to a third power supply voltage terminal, and a control terminal coupled to receive the second control signal from the load prediction circuit.

13. The voltage regulator of claim 12, wherein the first power supply voltage terminal is for receiving a positive power supply voltage, the second power supply voltage terminal is for receiving a negative power supply voltage, and the third power supply voltage terminal is for coupling to a ground.

14. The voltage regulator of claim 10, wherein the load prediction circuit predicts the increase in load current by monitoring instructions being executed.

15. A method for providing a regulated output voltage to a load in an integrated circuit, the method comprising:

providing the regulated output voltage from a source terminal of an N-channel transistor;

generating a feedback signal from the regulated output voltage;

providing the feedback signal to first and second comparators for controlling a bias voltage provided to a gate of the N-channel transistor; and controlling a voltage boost circuit coupled to the gate of the N-channel transistor for boosting the bias voltage by a predetermined voltage in response to anticipating an increased load current to the load.

16. The method claim 15, wherein anticipating an increased load current to the load further comprises anticipating an increased load current by monitoring instruction execution in the integrated circuit.

17. The method of claim 15, wherein boosting the bias voltage by a predetermined voltage further comprises using a capacitor to boost the bias voltage.

18. The method of claim 15, wherein controlling the voltage boost circuit comprises:

precharging a capacitor; and coupling the capacitor to the gate of the N-channel transistor in response to anticipating of the increased load current.

19. The method of claim 15, further comprising operating the N-channel transistor in a subthreshold region.

* * * * *